United States Patent

Gordon

Patent Number: 5,149,305
Date of Patent: Sep. 22, 1992

[54] CONTINUOUSLY ADJUSTABLE ROTARY BIAS DEVICE

[75] Inventor: James R. Gordon, Benton, Ill.

[73] Assignee: Gordon Belt Scrapers, Inc., Benton, Ill.

[21] Appl. No.: 745,733

[22] Filed: Aug. 16, 1991

[51] Int. Cl.$^5$ .............................................. F16H 7/08
[52] U.S. Cl. ................................... 474/101; 267/154; 464/88
[58] Field of Search ....................... 474/101, 109–111; 267/153, 154; 464/52, 55, 80, 88, 89

[56] References Cited

U.S. PATENT DOCUMENTS

| | | | |
|---|---|---|---|
| 4,171,920 | 10/1979 | Kramer et al. | 267/154 |
| 4,533,036 | 8/1985 | Gordon | 474/92 X |
| 4,854,443 | 8/1989 | Gordon | 198/497 |
| 4,925,434 | 5/1990 | Swinderman | 474/101 |
| 4,995,851 | 2/1991 | Taylor et al. | 474/101 |
| 5,088,965 | 2/1992 | Swinderman et al. | 474/101 |

Primary Examiner—Thuy M. Bui
Attorney, Agent, or Firm—Kinzer, Plyer, Dorn, McEachran & Jambor

[57] ABSTRACT

A resilient rotational bias device that is continuously adjustable to supply any preselected rotational bias force to a shaft, within a wide range, by rotation of a multi-step shaft retention member, usually a gear, by a simple drive such as a worm gear that engages the shaft retention member; the shaft retention member an the drive are mounted in a housing that is affixed to one end of a resilient torsion member, the other end of the torsion member being affixed to a stationary frame. All elements of the device other than the torsion member, but including a connector for connecting the shaft retention member to the end of a biased shaft, are mounted in the housing. All elements of the device, except a drive shaft for th worm gear, are usually formed of the same molding resin, preferably polyurethane.

20 Claims, 2 Drawing Sheets

CONTINUOUSLY ADJUSTABLE ROTARY BIAS DEVICE

BACKGROUND OF THE INVENTION

In various applications it is necessary or desirable to provide a resilient rotary bias device for maintaining continuous rotary "tension" on a shaft; the bias device is usually expected also to function as a shock absorber in those instances in which the shaft may be subject to a force exceeding the bias level. Resilient rotational bias devices of this general type can be used in some forms of exercise equipment. Another appropriate application for a rotary resilient bias device is on the operating shaft of a conveyor belt scraper, either a primary scraper or a secondary scraper.

In some of these applications, it is necessary or desirable to provide some arrangement for adjusting the rotary biasing force applied by the device to a shaft or other like member. Frequently, this is done with set screws that are released to permit setting of the rotational bias force to be exerted by the device. An example of an apparatus of this kind is presented in Swinderman et al. U.S. Pat. No. 4,925,434. Another apparatus used for this purpose, employing a pin and key connection between the shaft and the resilient rotary bias device, is described in Gordon U.S. Pat. No. 4,533,036. Known arrangements of this kind, however, have required a change of bias in discrete steps; thus, they have not permitted adjustment of the bias force to any desired level within a given range, on a continuous basis. Moreover, the set screws and other fasteners employed in apparatus of this kind have sometimes been unsatisfactory from the standpoint of corrosion and have a tendency to adhere to the other components of the apparatus, particularly in conveyor belt cleaners when used in adverse environmental conditions as may be encountered in mines, power plants, and even in food processing establishments.

SUMMARY OF THE INVENTION

It is an object of the invention, therefore, to provide a new and improved resilient rotational bias device that is continuously adjustable to apply any preselected rotational bias force, within a wide range, to a shaft or like member, with adjustment of the bias device being readily and conveniently effected.

Another object of the invention is to provide a new and improved resilient rotational bias device that can be adjusted to apply any preselected rotational bias force to a shaft or like member, in a construction in which the device utilizes a minimal number of metal parts and those parts are essentially encompassed within a molded resin or other highly corrosion resistant housing.

A further object of the invention is to provide a new and improved resilient rotational bias device continuously adjustable over a wide range of bias forces, that is simple and inexpensive to manufacture, that has long life, and that can be readily and conveniently adjusted for different force levels.

Accordingly, the invention relates to a continuously adjustable, resilient, rotational bias device for applying a resilient rotary torsion force to a shaft or like rotatable member, at any selected bias force level within a predetermined bias force range. The device comprises a housing, a rotary retention member rotatably mounted in the housing, and drive means, also mounted in the housing, for rotating the retention member to any one of a multiplicity of different angular orientations in the housing, within a given range, and for retaining the retention member in any such rotational orientation. The device further comprises a resilient rotary bias member, first anchor means for anchoring one end of the bias member to the housing, second anchor means for anchoring the other end of the bias member to preclude rotation thereof, and connecting means for connecting a shaft or like rotatable member to the retention member for rotation therewith.

DESCRIPTION OF THE PREFERRED EMBODIMENT

Figure 1:
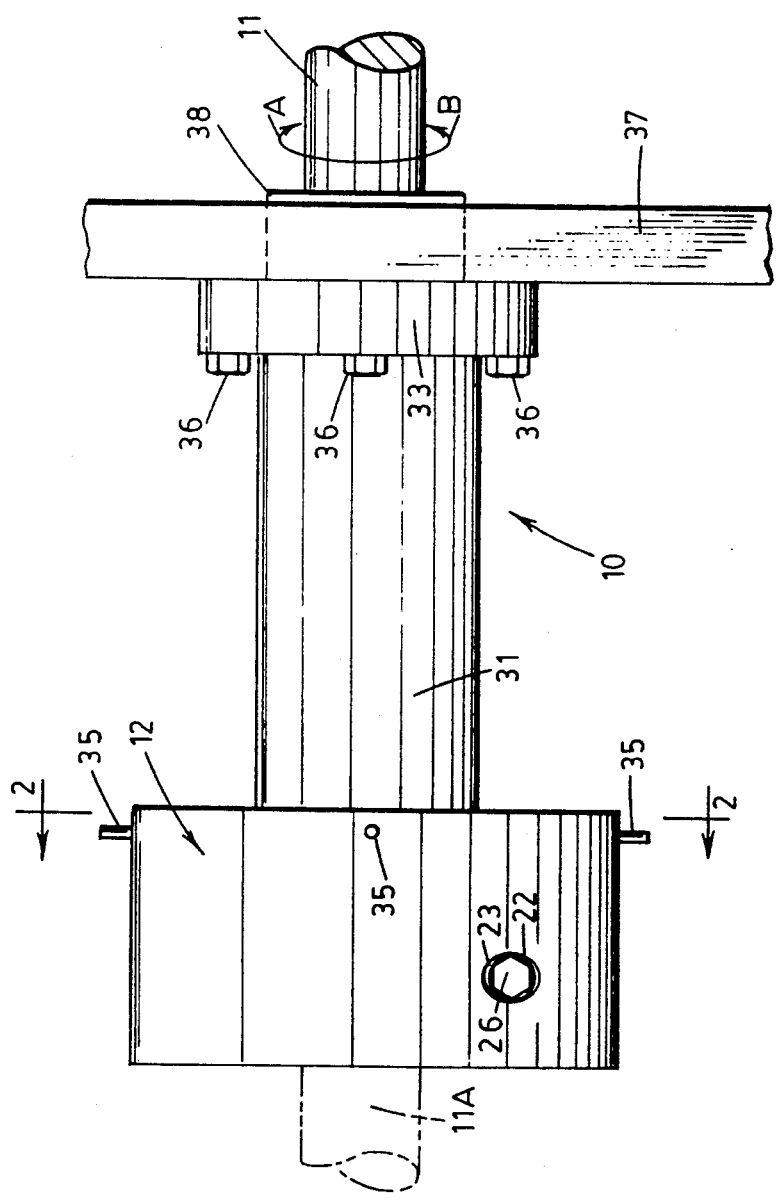
FIG. 1 is a sectional elevation view of a continuously adjustable resilient rotational bias device according to a preferred embodiment of the invention.
Figure 3:
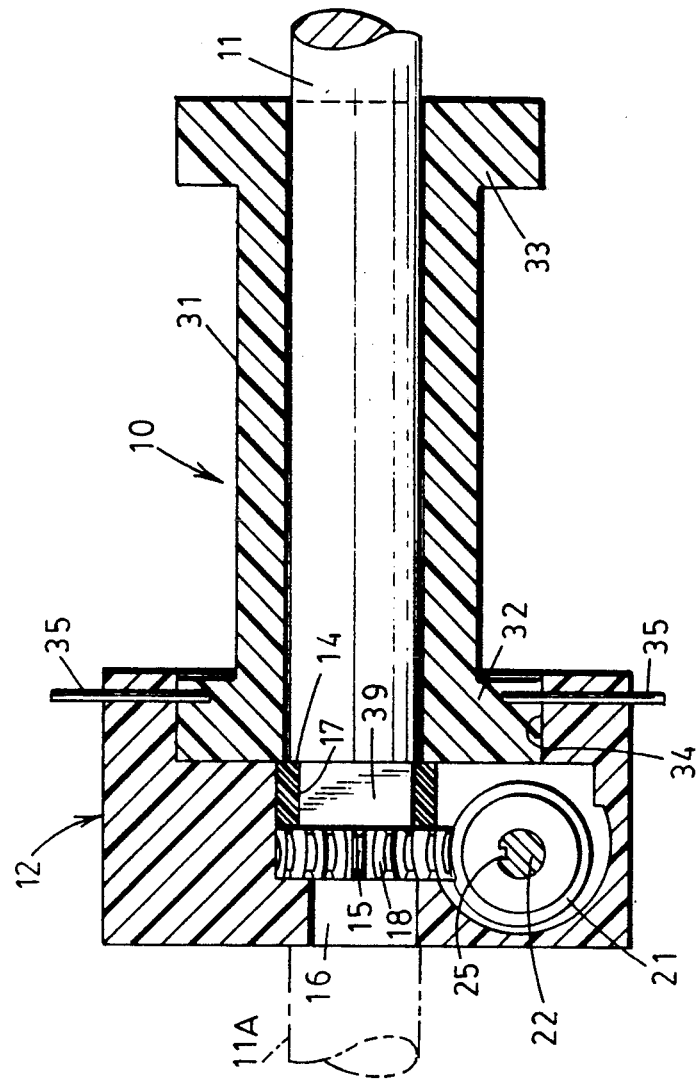
FIG. 3 is a sectional elevation view of the complete device taken approximately as indicated by line 3—3 in FIG. 2.
Figure 2:
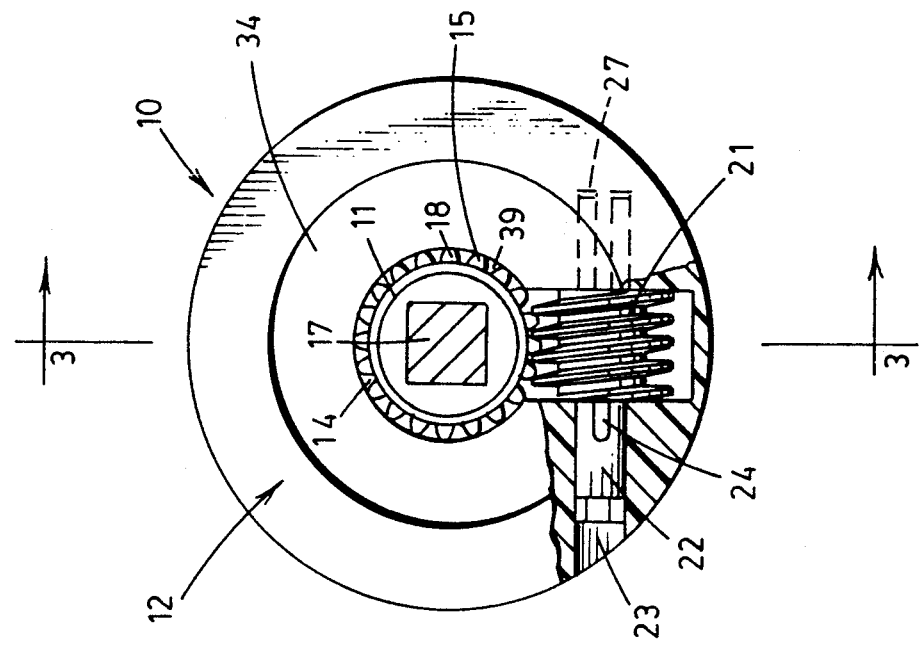
FIG. 2 is a detail elevation view, partly in cross section, taken approximately as indicated by line 2—2 in FIG. 1 but with the torsion tube of the device removed.

FIGS. 1-3 illustrate a continuously adjustable, resilient, rotational bias device 10 for applying a resilient rotary torsion force to a shaft 11, or to any like rotatable member, at any selected bias force level within a predetermined range. The rotational bias device 10 can bias shaft 11 toward rotation in either a clockwise or a counterclockwise direction, as indicated by arrows A and B; that is, device 10 is bi-directional in operation.

Device 10 comprises a housing 12 preferably formed of a molded resin. A preferred molding resin for fabrication of housing 12 is polyurethane, an elastomeric resin that has excellent corrosion resistance and good physical properties. Typically, the polyurethane used for housing 12 may have a hardness of about 70 on a shore D durometer scale. Inside housing 12 there is a circular recess 14. A rotary shaft retention member 15 is rotatably mounted in the recess 14 in housing 12. As shown in FIG. 3, there may be an axial opening 16 communicating with recess 14 from the outside of one side of housing 12. In this instance, in the orientation shown in FIG. 3 the axial opening 16 is to the left of the recess 14 in which retention member 15 is mounted.

In device 10, the rotary shaft retention member 15 has a square axial opening 17. Member 15 comprises a gear with curved teeth 18 that mesh with a worm gear 21 mounted on a shaft 22. One end of shaft 22 is accessible from the outside of housing 12 through an opening 23. The shaft may include a keyway 24 (FIG. 2) interfitted with a key 25 in the bore of worm gear 21 (FIG. 3). The end of shaft 22 that is exposed through opening 23 may include a conventional hexagonal socket 26, suitable for receiving a conventional Allen wrench. The other end of shaft 22 may be positioned in a blind end 27 of the aperture in housing 12 that receives the shaft.

The resilient rotational bias device 10 of FIGS. 1-3 further comprises a resilient rotary bias member 31 having relatively thick flanges 32 and 33 at its opposite ends. Flange 32 fits tightly within an annular recess 34 in the face of housing 12 opposite opening 16. Housing 12 is pinned to flange 32 of bias member 31 by a series of radial pins 35. Flange 33 is anchored to a fixed frame member by suitable means such as a plurality of bolts 36.

In the preferred construction shown in FIGS. 1-3, shaft 11 is journaled in an appropriate bearing 38 in the fixed frame member 37. Shaft 11 extends through the tubular resilient rotary bias member 31 and terminates in a square end portion 39 that fits into the square socket 17 in shaft retention member 15. Thus, socket 17 and the complementary shaft end portion 39 afford an effective means for connecting shaft 11 to retention member 15 so that rotation of one entails rotation of the other.

Figure 4:
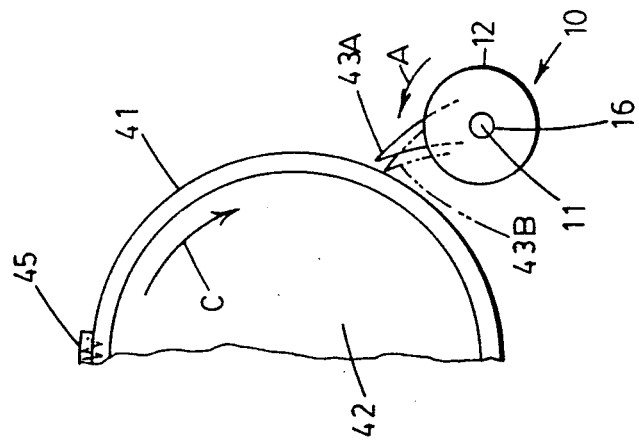
FIG. 4 is a schematic illustration used to explain operation of the bias device of FIGS. 1-3.

Operation of the continuously adjustable, resilient, rotational bias device 10 can best be understood by reference to the simplified illustration afforded in FIG. 4, in which the fixed frame or support member 37 has been eliminated to provide better visualization of operational aspects of the invention. At the outset, it may be assumed that device 10 is installed on a fixed frame, as previously described, and that its shaft 11, which projects away from the plane of FIG. 4, carries one or more resilient scraper blades aligned in the position generally indicated at 43A. The scraper blades are to be employed as a primary cleaner for a conveyor belt 41 moving past device 10 and its shaft 11 around a head pulley 42, the direction of belt movement being indicated by arrow C. At the outset, the tip end of each conveyor blade is spaced a short distance from the outer surface of conveyor belt 41.

At this point, a conventional Allen wrench can be fitted into the socket 26 in the accessible end 22 of the shaft for worm gear 21; see FIGS. 1-3. The worm gear is rotated, in turn rotating the mating gear comprising shaft retention member 15, to turn shaft 11 in the direction of arrow A (FIG. 4) until the scraper blades reach the position 43B at which they contact the outer surface of conveyor belt 41. Ordinarily, alignment of shaft 11 with respect to belt 41 and its pulley 42 is not perfect, so that one end of the elongated scraper blade or array of scraper blades contacts belt 41 slightly before the other end. Indeed, surface irregularities may be reflected in similar irregularities in attaining contact between the scraper blades and the conveyor belt. This is immaterial because the rotation of the worm gear is continued until an appreciable rotary bias force in the direction of arrow A impels the blades into engagement with the outer surface of belt 41. Indeed, the worm gear actuation continues until a desired continuous bias force is achieved for shaft 11, and, through the shaft, for the scraper blades at position 43B.

The foregoing description constitutes all of the operational steps necessary to put the continuously adjustable, resilient, rotational bias device 10 in operation. With continued wear on the conveyor belt scraper blades, the torsion applied by device 10 to the blades may become inadequate. This can be observed as the efficiency of the scraper reduces with blade wear. It is then a simple matter to again apply an Allen wrench to the accessible socket of worm gear shaft 22, crank up the torsional force to where the conveyor belt scraper works well again, and allow the device 10 to continue to do its job. The force adjustment can occur several times in the wear life of a set of scraper blades. Indeed, adjustment on a monthly, weekly, or even daily basis can be made. During operation, whenever a joint in belt 41, such as joint 45, passes the scraper blades at position 43B, the resultant impact opposed to the torsion bias force A is taken up by the resilient construction of the blades themselves and by the resilience all that time,of device 10. The same applies for any relatively thick material that adheres to belt 41 and that may apply an impact or shock force to the conveyor belt cleaner.

Among the advantages of the resilient rotational bias device 10 are the convenience of adjustment of the rotary torsion bias force applied by that device and its virtually complete construction from materials that are not subject to corrosion in dirty environments. In the preferred construction the main housing or hub 12, the torsion member 31, the shaft retention gear 15, and the worm gear 21 are all formed of molded resin, usually the same resin. The elastomer polyurethane is preferred. In fabricating these components, the polyurethane compositions used for the resilient rotary bias member, torsion tube 31, and for housing 12, may be somewhat softer than utilized for the other members. For example, a durometer of 70D may be used for housing 12, with a harder durometer of 90-95A for the gears. Brass gears may also be employed. Even if a different resin (e.g., nylon) is used for members 12, 15 and 21, torsion tube 31 is formed of an elastomer.

For maximum protection against corrosion, it may be desirable to mount a plug of polyurethane or other resin in the axial opening 16 of housing 12 (FIG. 3). On the other hand, shaft 11 can be connected to retention member 15 and its socket 17 through the axial opening 16 as indicated by the phantom outline 11A. In that case, there would usually be no need for an additional plug for any axial opening because the opening through torsion member 31, which receives shaft 11 in the illustrated arrangement, would be closed by frame member 37 (FIG. 1). Of course, a small plug can also be used to seal the opening 23 that affords access to the socket 26 in the end of worm gear shaft 22. No plug has been shown because this is frequently unnecessary. It may also be noted that pins 35, shown as securing the rim of hub 12 to flange 32 of torsion tube 31 may be formed of metal or of hard resin or may be replaced by conventional set screws.

From the foregoing description it will be seen that the molded resin housing 12 (preferably polyurethane) provides recesses for flange 32 of the tubular, resilient rotary bias member 31, for the gear 15 that acts as a retention member for the end of shaft 11, and for the worm gear 21, along with the worm gear shaft 22. All of the operating members 15, 21 and 22, along with the connection end 39 of shaft 11, are fully enclosed in the housing 12; device 10 is suitable for use in dirty environments, as encountered in mines and power stations, in environments that require extreme cleanliness such as food processing plants, and in virtually any other environment. In any application, device 10 allows prompt, convenient adjustment of the rotary bias force applied to shaft 11, clockwise or counter clockwise to any level device 10 can withstand at any time merely by turning worm shaft 21.

I claim:

1. A continuously adjustable, resilient, rotational bias device for applying a resilient rotary torsion force to a shaft or like rotatable member, at any selected bias force level within a predetermined bias force range, comprising:

a housing;

a rotary retention member, rotatably mounted in the housing;

drive means, mounted in the housing, for rotating the retention member to any one of a multiplicity of different angular orientations in the housing, within a given range, and for retaining the retention member in any such rotational orientation;

a resilient rotary bias member;

first anchor means for anchoring one end of the bias member to the housing;

second anchor means for anchoring the other end of the bias member to preclude rotation thereof; and connecting means for connecting a shaft to the retention member for rotation therewith.

2. An adjustable, resilient, continuous rotary torsion force device according to claim 1 in which:

the housing includes an external opening affording access to the drive means from the exterior of the housing.

3. A continuously adjustable, resilient, rotational bias device according to claim 2 in which the housing is formed of molded resin, including receptacles for the retention member and the drive means.

4. A continuously adjustable, resilient, rotational bias device according to claim 1 in which:

the retention member is a molded resin gear;

and the drive means includes a worm gear in meshing engagement with the retention gear.

5. A continuously adjustable, resilient, rotational bias device according to claim 4 in which:

the worm gear of the drive means is formed of molded resin and is mounted on a metal drive shaft, with one end of the drive shaft accessible from the exterior of the housing.

6. A continuously adjustable, resilient, rotational bias device according to claim 5 in which the housing is formed of molded resin, including receptacles for the retention member and the drive means.

7. A continuously adjustable, resilient, rotational bias device according to claim 1 in which:

the retention member is a molded resin gear;

and the connecting means comprises a socket molded integrally into the retention member to receive a complementary, mating projection on the end of a shaft.

8. A continuously adjustable, resilient, rotational bias force device according to claim 1 in which the bias member is a molded cylindrical resin member, formed of an elastomeric resin.

9. A continuously adjustable, resilient, rotational bias force device according to claim 8 in which:

the retention member is a molded resin gear;

the drive means includes a molded resin worm gear in meshing engagement with the retention gear;

the connecting means comprises a socket molded integrally into the retention member to receive a complementary mating projection on the end of a shaft;

and all elements of the device other than the bias member are enclosed in the main housing.

10. A continuously adjustable, resilient, rotational bias force device according to claim 9 in which:

the housing is formed of molded resin, including receptacles for the retention member and the drive means; and the housing includes an external opening affording access to the drive means from the exterior of the housing.

11. A continuously adjustable, resilient, rotational bias device according to claim 10 in which the housing, the retention member, and the worm gear are all made from the same resin.

12. A continuously adjustable, resilient, rotational bias device according to claim 11 in which the resin is an elastomeric resin, and in which the torsion member is molded from the same elastomeric resin.

13. A continuously adjustable, resilient, rotational bias force device according to claim 12 in which the molding resin is polyurethane.

14. An adjustable, resilient, continuous rotary torsion force device according to claim 1 in which:

the resilient rotary bias member is a tube having two mounting flanges of the same dimensions, one on each of the opposite ends of the tube, one mounting flange fitting into a recess in the housing, and comprising a part of the first anchor means, the other mounting flange comprising a part of the second anchor means.

15. An adjustable, resilient, continuous rotary torsion force device according to claim 14 in which:

the housing includes an external opening affording access to the drive means from the exterior of the housing.

16. A continuously adjustable, resilient, rotational bias device according to claim 14 in which the housing is formed of molded resin, including receptacles for the retention member and the drive means.

17. A continuously adjustable, resilient, rotational bias force device according to claim 15 in which:

the retention member is a molded resin gear;

the drive means includes a molded resin worm gear in meshing engagement with the retention gear;

the connecting means comprises a socket molded integrally into the retention member to receive a complementary mating projection on the end of a shaft;

and all elements of the device other than the bias member are enclosed in the main housing.

18. An adjustable, resilient, continuous rotary torsion force device according to claim 17 in which the housing, the shaft retention gear member, the worm gear, and the bias member are all formed of polyurethane resin.

19. A continuously adjustable, resilient, rotational bias device for applying a resilient rotary torsion force to a shaft or other rotatable element comprising:

a first gear;

drive means, for rotating the first gear to any one of a multiplicity of different angular orientations within a given range, and for retaining the gear in that orientation, a housing enclosing the first gear and the drive means;

a cylindrical, resilient, rotary bias member;

first anchor means for anchoring one end of the bias member to the housing;

second anchor means for anchoring the other end of the bias member to preclude rotation thereof; and connecting means for connecting a shaft or other rotatable element to the first gear.

20. A continuously adjustable, resilient, rotational bias device according to claim 19 in which the drive means includes a second gear in meshing engagement with the first gear.

* * * * *